(12) United States Patent
Zinjuwadia et al.

(10) Patent No.: US 9,077,607 B2
(45) Date of Patent: Jul. 7, 2015

(54) BORDER GATEWAY PROTOCOL INBOUND POLICY OPTIMIZATION

(75) Inventors: Kalpesh Zinjuwadia, San Jose, CA (US); Srikanth Rao, Fremont, CA (US)

(73) Assignee: Force10 Networks, Inc., San Jose, CA (US)

( * ) Notice: Subject to any disclaimer, the term of this patent is extended or adjusted under 35 U.S.C. 154(b) by 1029 days.

(21) Appl. No.: 12/842,242

(22) Filed: Jul. 23, 2010

(65) Prior Publication Data
US 2012/0020364 A1    Jan. 26, 2012

(51) Int. Cl.
| | | |
|---|---|---|
| H04L 12/66 | (2006.01) | |
| H04L 29/06 | (2006.01) | |
| G06F 15/16 | (2006.01) | |
| G06F 15/173 | (2006.01) | |
| H04L 12/751 | (2013.01) | |
| H04L 12/741 | (2013.01) | |
| H04L 12/721 | (2013.01) | |
| H04L 12/813 | (2013.01) | |
| H04L 12/715 | (2013.01) | |

(52) U.S. Cl.
CPC .......... *H04L 45/02* (2013.01); *H04L 29/06578* (2013.01); *H04L 63/0227* (2013.01); *H04L 45/745* (2013.01); *H04L 45/44* (2013.01); *H04L 47/20* (2013.01); *H04L 45/04* (2013.01)

(58) Field of Classification Search
CPC ............ H04L 12/66; H04L 2012/5618; H04L 2012/5636; H04L 29/0621; H04L 29/06224; H04L 29/06578; H04L 45/02; H04L 45/04; H04L 45/44; H04L 45/745; H04L 47/20; H04L 63/0227; H04L 65/1013; H04L 65/102
See application file for complete search history.

(56) References Cited

U.S. PATENT DOCUMENTS

| | | | | |
|---|---|---|---|---|
| 6,392,997 | B1 * | 5/2002 | Chen | 370/252 |
| 6,567,380 | B1 * | 5/2003 | Chen | 370/238 |
| 7,023,808 | B2 * | 4/2006 | Ball et al. | 370/238 |
| 7,359,393 | B1 * | 4/2008 | Nalawade et al. | 370/401 |
| 7,558,877 | B1 * | 7/2009 | Fedyk et al. | 709/242 |
| 7,571,241 | B1 * | 8/2009 | Nalawade | 709/230 |
| 7,599,313 | B2 * | 10/2009 | Patel et al. | 370/254 |
| 7,616,574 | B2 * | 11/2009 | Previdi et al. | 370/238 |
| 7,633,874 | B1 * | 12/2009 | Nalawade et al. | 370/238 |
| 7,710,899 | B1 * | 5/2010 | Ward et al. | 370/254 |
| 7,739,404 | B2 * | 6/2010 | Li | 709/242 |
| 7,751,331 | B1 * | 7/2010 | Blair et al. | 370/236 |

(Continued)

OTHER PUBLICATIONS

Y. Rekhter et al., "A Border Gateway Protocol 4 (BGP-4)" Request for Comment (RFC) 1771, Internet Engineering Task Force, http://www.ietf.org, Mar. 1995, pp. 1-57.*

*Primary Examiner* — Alpus H Hsu
(74) *Attorney, Agent, or Firm* — Haynes and Boone, LLP

(57) ABSTRACT

A BGP capable packet network device is located at the boundary of an autonomous network and in communication with a peer BGP capable packet network device in a neighboring autonomous network. The BGP capable packet network device is comprised of one or more line cards for receiving and, processing and sending packets of information, and for receiving and forwarding routing update information to a route processor comprising the packet network device. The route processor runs a border gateway protocol which is configured with one or more policies that operate to filter the routing update information received from the line card. The routing update information filter is comprised of at least one variable length path attribute and the filter operates such that it only applies the variable length path attribute one time to the routing update information.

20 Claims, 11 Drawing Sheets

(56) References Cited

U.S. PATENT DOCUMENTS

| | | | |
|---|---|---|---|
| 7,773,596 B1* | 8/2010 | Marques | 370/392 |
| 7,787,396 B1* | 8/2010 | Nalawade et al. | 370/254 |
| 7,969,907 B2* | 6/2011 | Shah et al. | 370/254 |
| 7,990,893 B1* | 8/2011 | Singh | 370/254 |
| 8,064,443 B2* | 11/2011 | Scudder | 370/389 |
| 8,141,156 B1* | 3/2012 | Mao et al. | 726/23 |
| 8,155,129 B2* | 4/2012 | Appanna et al. | 370/401 |
| 8,254,396 B2* | 8/2012 | Appanna et al. | 370/401 |
| 8,391,303 B2* | 3/2013 | Li | 370/401 |
| 2005/0074003 A1* | 4/2005 | Ball et al. | 370/389 |
| 2006/0140136 A1* | 6/2006 | Filsfils et al. | 370/255 |
| 2006/0174035 A1* | 8/2006 | Tufail | 709/239 |
| 2006/0182038 A1* | 8/2006 | Nalawade et al. | 370/252 |
| 2006/0198322 A1* | 9/2006 | Hares | 370/254 |
| 2006/0209851 A1* | 9/2006 | Scudder et al. | 370/401 |
| 2007/0055789 A1* | 3/2007 | Claise et al. | 709/234 |
| 2010/0202466 A1* | 8/2010 | Eswaran | 370/400 |
| 2010/0271954 A1* | 10/2010 | Eswaran | 370/241 |
| 2011/0026533 A1* | 2/2011 | Nalawade | 370/401 |

\* cited by examiner

FIG. 4A  FILTER FORMAT BASED ON PREFIX ip prefix-list filter-nlri
permit 12.2.1.0/24
permit 34.1.1.1/32
permit 10.1.1.0/24
deny any

FIG. 4B  FILTER FORMAT BASED ON AS-PATH ATTRIBUTE ip as-path access-list filter-as-path
permit ^12345
permit ^(23(_) + (112_) + $
deny .*

FIG. 4C  FILTER FORMAT BASED ON COMMUNITY-LIST ip community-list filter-community
permit 6543:2245
permit no-advertise
deny regexp.*

FIG. 4D  FILTER FORMAT BASED ON ROUTE-MAP route-map filter-pa permit 10
  match ip address filter-nlri
  match metric 345
route-map filter-pa permit 20
  match as-path filter-as-path
  match ip next-hop prefix-list
    filter-next-hp
route-map filter-pa permit 30
  match origin igp
  match community filter-comm2

FIG. 5   PRIOR ART   POLICY FILTER CONFIGURATION 50

- prefix-list (P1)
- as-path list (A1)
- route-map
  - nlri (P2)
  - communities (C1)
  - as-path (A2)

FIG. 7

POLICY FILTER CONFIGURATION 70

- EXPLICITLY APPLIED FIXED LENGTH PATH ATTRIBUTES

- EXPLICITLY APPLIED PREFIX-LIST-P

- EXPLICITLY APPLIED COMMUNITY-LIST-C

- EXPLICITLY APPLIED ROUTE-MAP-R

- R INCLUDES N SEQUENCES, WHERE "N" IS AN INTEGER
  - EACH SEQUENCE CAN INCLUDE IMPLICIT PATH ATTRIBUTE FILTER CRITERIA OR PREFIX LIST FOR NLRIs

FIG. 8A POLICY FILTER PROCESS 80
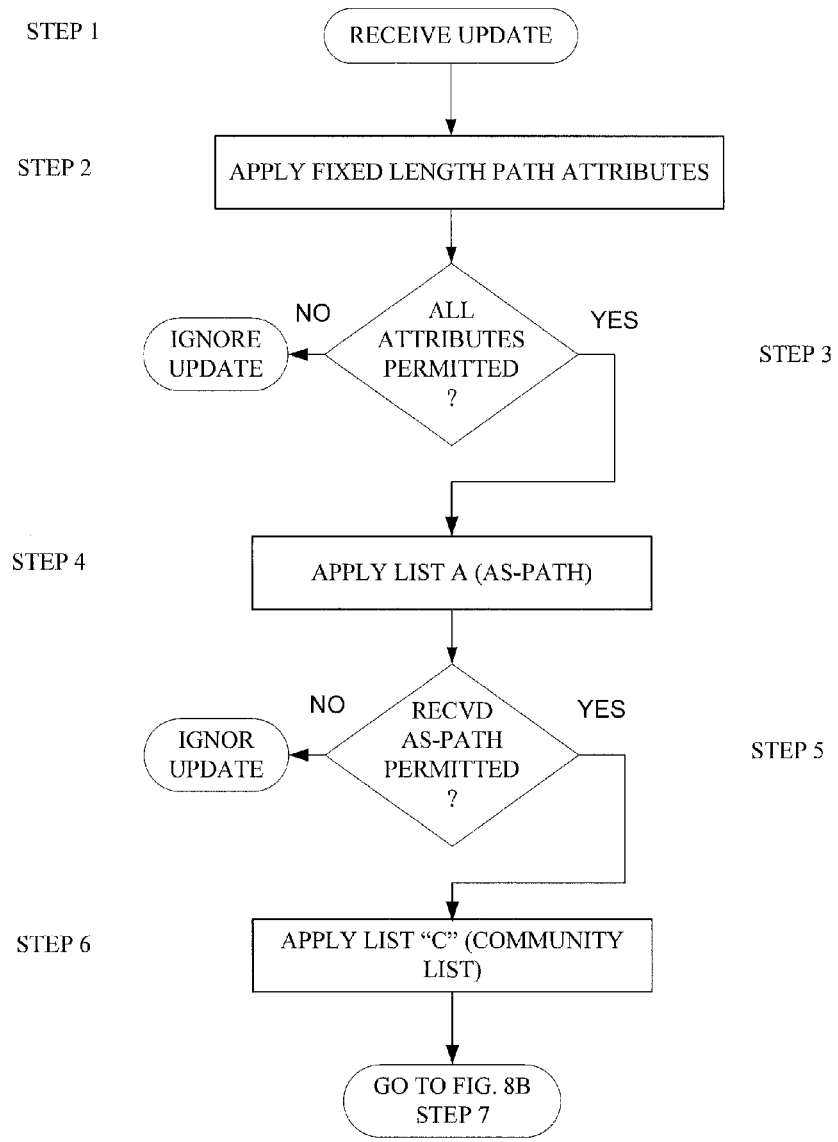

BORDER GATEWAY PROTOCOL INBOUND POLICY OPTIMIZATION

BACKGROUND

1. Field of the Invention

The present disclosure relates generally to the operation of the Border Gateway Protocol and specifically to a method for efficiently filtering update network information sent by one BGP speaker to another BGP speaker.

2. Description of Related Art

Large communication networks (WAN) are typically composed of a large number of smaller networks (LAN) which are interconnected in a manner that permits a packet network device that is a member of one LAN to send and receive information to a packet network device that is a member of another LAN. In the event that a LAN is administered by one entity, it can be referred to as an autonomous system (AS). An autonomous system is a collection of Internet Protocol routing prefixes that are administered by one, central entity, such as one company or one organization. A number of standard routing protocols have been created that operate to share information relating to one AS with another AS. One such routing protocol that operates within an AS environment is the Border Gateway Protocol or BGP. BGP runs on packet network devices included in an AS and referred to as BGP speakers, and they generally operate to exchange routing information, about the AS in which they are a member, with another, neighboring AS. A BGP speaker is typically positioned at the edge of an AS and in communication with another BGP speaker located in a neighboring AS.

BGP running on a speaker generates and sends a number of different types of messages to other peer speakers in the same AS or to speakers located in neighboring AS's. These messages are used by the speakers to establish peering sessions, to exchange routing information, to report errors, to maintain a TCP connection and to request full routing information. The message that is generated by a BGP speaker to exchange routing information is called an update message, and this message among other things includes information about one or more paths in the AS, typically referred to as a path attribute, and it can include network layer reachability information (NLRI) which is one or more IP prefixes of a particular length. When a packet network device that is also a speaker detects a change in the AS in which it is a member, it generates and sends an update message to all peer speakers with which it can communicate. A network change that can result in the generation of an update message can be a new device connected to the AS, or it can be the result of an existing device going out of service due to some failure event, or for any one of a number of other reasons.

As autonomous systems grow in size and complexity, the number of update messages that are generated by speakers typically grows as well. Processing the update messages is a CPU-intensive operation, and can significantly degrade the overall BGP convergence or the time it takes for BGP to update forwarding tables. One solution to this problem is described in the IETF document RFC5291, which defines a BGP-based mechanism wherein a BGP speaker can filter outbound update messages and wherein the BGP speaker can send the filter information to a peer device which can also enforce similar outbound filtering of update messages that it creates.

SUMMARY

As opposed to filtering outgoing update messages, policies on BGP speakers can be configured to filter incoming update messages in a manner that eliminates or greatly reduces redundant filtering steps. By reducing the number of redundant filtering steps, the border gateway protocol process running on a BGP speaker can more rapidly converge to a stable network topology and reduce the possibility of losing network traffic. In one embodiment, a BGP capable packet network device, such as a router, includes a policy filter that is configured with at least one path attribute. The router operates to receive incoming update messages and applies the policy filter to these messages such that the path attribute in the filter is applied to the message only one time, and if there is a match between the path attribute in the filter and a path attribute in the incoming update message, the update message is processed.

BRIEF DESCRIPTION OF THE DRAWINGS

FIG. 4A is a diagram illustrating the format of a filter based on a prefix list.

FIG. 4B is a diagram illustrating the format of a filter based on an AS-PATH attribute.

FIG. 4C is a diagram illustrating the format of a filter based on a community-list.

FIG. 4D is a diagram illustrating the format of a filter based on a route-map.

FIG. 5 is a diagram illustrating a policy filter configuration.

FIG. 7 is a diagram illustrating another policy filter configuration.

FIG. 8A-8D is a logical flow diagram of an embodiment of the update message filtering method.

DETAILED DESCRIPTION

The Border Gateway Protocol (BGP) is an exterior gateway protocol that is employed to maintain tables of network layer reachability information (NLRI) among neighboring autonomous systems (AS). Reachability information in the context of BGP includes, among other things, a listing of IP networks or subnetworks in the form of prefixes that are used as destination addresses for routing packets from one AS to another AS. NLRI can be the IP address associated with a single packet network device included in an AS or it can be associated with an aggregation of packet network devices included in an AS. The tables that are built and maintained by BGP are typically referred to as routing tables and the information used by BGP to build these routing tables is included in update messages generated by a packet network device running BGP (BRP speaker) and sent to some or all of the peer BGP speakers. Other protocols such as OSPF and RIP running on a BGP speaker can be employed to gather reachability information associated with other non-speaker packet network devices resident in an AS.

Figure 1:
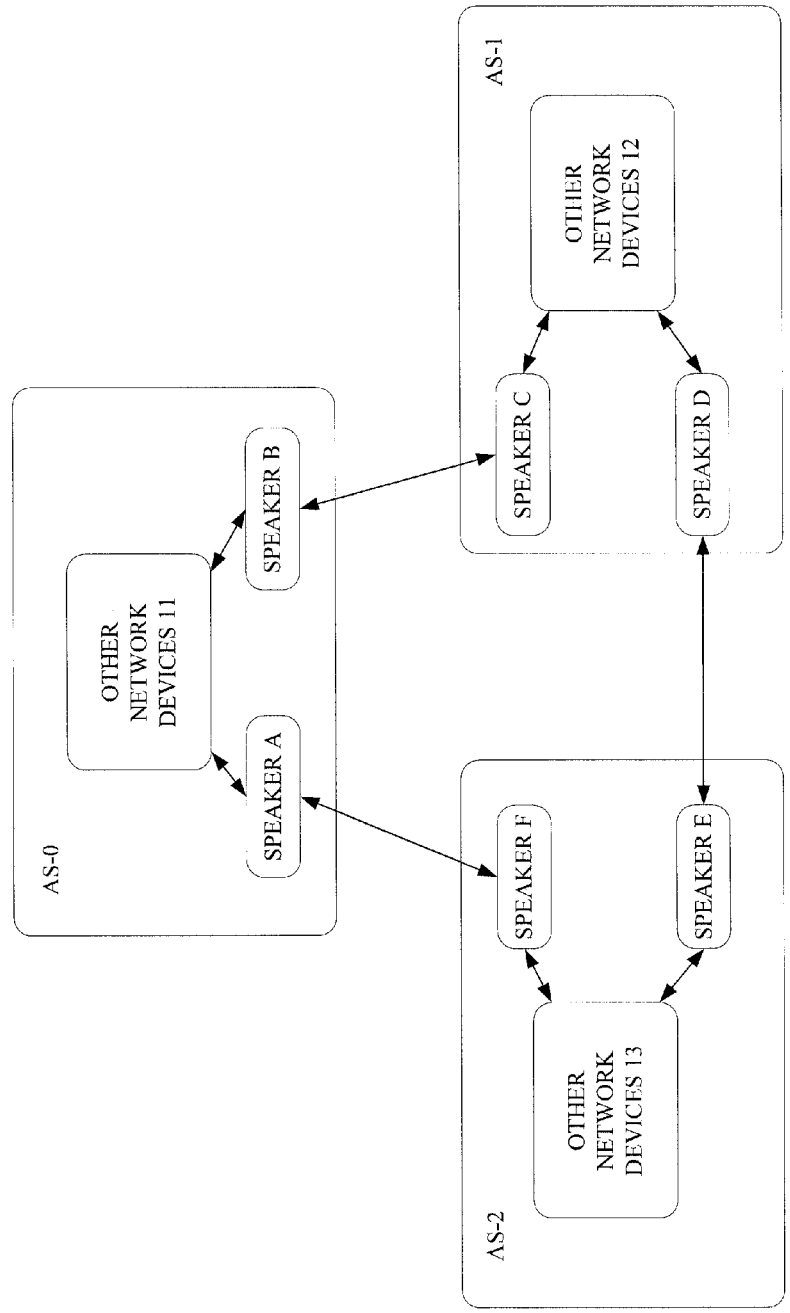
FIG. 1 is a network level diagram showing three interconnected autonomous systems and associated packet network devices.

The connectivity among three autonomous systems, AS0, AS1 and AS2, and the packet network devices comprising each AS is shown with reference to FIG. 1. As described previously, an AS is a grouping of network devices/prefixes, in this case routers, that are under the control of one network administrator or entity. The routers and other network devices comprising an AS are typically located within the same geographic area, such as within a Town, a corporate location or similar geographic relationship. Each of the three autonomous systems in this case include two BGP speakers and a number N of other network devices, where N is an integer. AS-0 includes speakers A and B and other devices 11, AS-1 includes speakers C and D and other devices 12, and AS-2 includes speakers E and F and other devices 13. The prefixes assigned to the other devices in each of the autonomous systems can constitute a prefix list comprising the NLRI included in an update message generated and sent by any one of the BGP speakers A-F. Two update messages are illustrated as being sent between BGP speakers B and C. As described earlier, the information included in an update message is gathered by other network protocols from the other network devices in the AS and stored by a BGP speaker and then used by the speaker to generate an update message.

Figure 2:
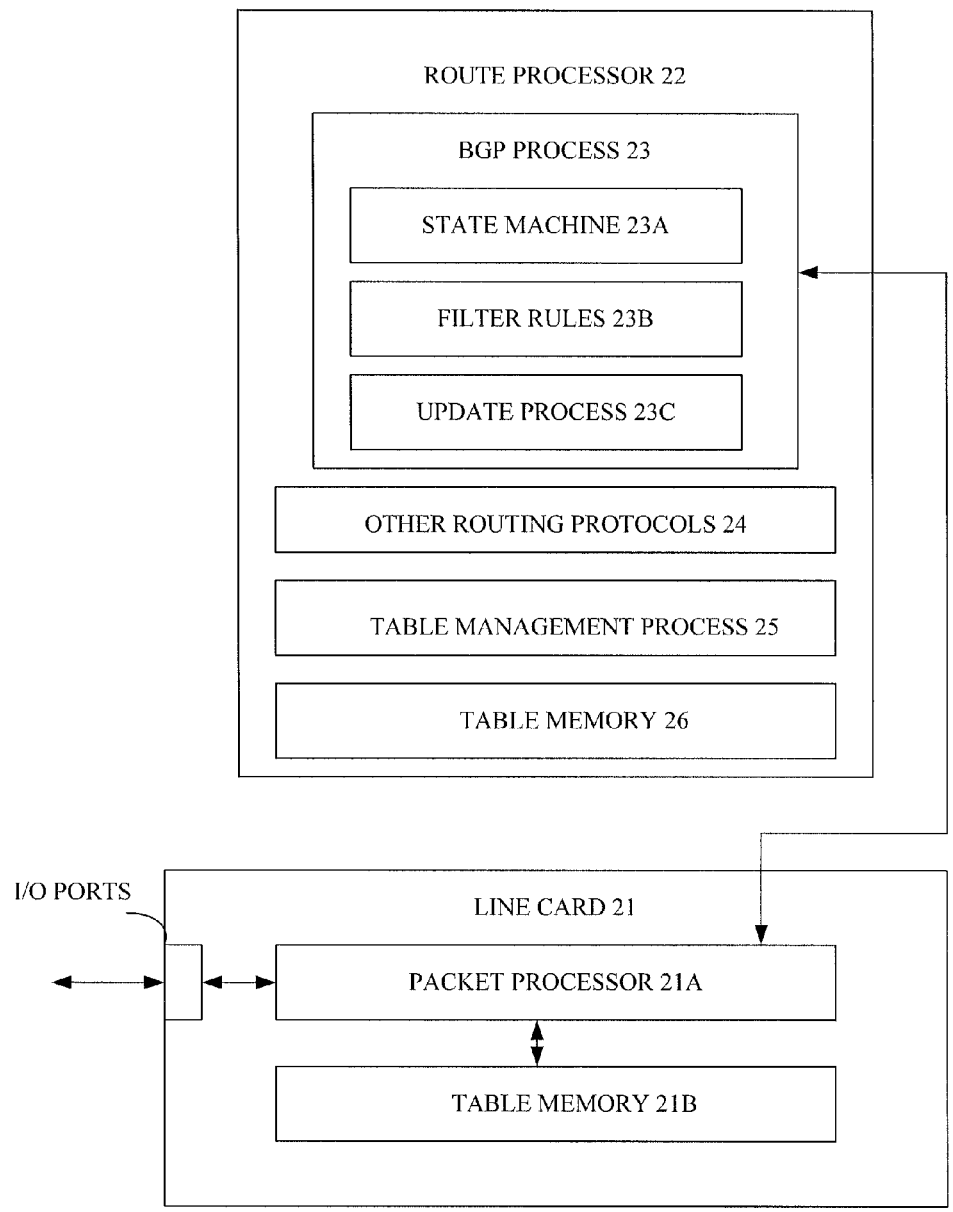
FIG. 2 is a block diagram showing functionality comprising a representative BGP speaker.

FIG. 2 is a high level block diagram illustrating functionality that can be included in an embodiment of a BGP speaker 20, such as one of the BGP speakers in FIG. 1. BGP speaker 20 includes, among other things, one or more line cards 21 with one or more input/output ports and a route processor 22. The input /output ports can operate to send and receive packets of information to and from other packet network devices that are members of the same autonomous system, and these ports can operate to send and receive packets to and from devices that are members of neighboring autonomous systems, in which case the packets can be update messages . Line card 21 is comprised of a packet processor 21A and a memory 21B for storing forwarding table information used by the packet processor to determine how to route packets of information to their proper destination. The packet processor 21A generally operates on information contained in incoming and outgoing packet headers so that these packets can be routed to their proper destination, which can be a packet network device with a next hope address located in the same autonomous system or a neighboring autonomous system. In the event that an update message is received at an input port to the line card 21, the packet processor examines the packet in which the update message is included and determines that the information in the packet should be sent to the router processor 22.

Continuing to refer to FIG. 2, the route processor 22 can implement a Border Gateway Protocol process 23 as firmware in a special purpose processor or as software for use by a general purpose processor. Regardless, the BGP process 23 functions to run a BGP state machine 23A, it operates to run rules 23B that are created to enforce policies and it operates to run update message processing 23C. Other routing protocols 24 such as OSPF and/or RIP are typically included in the route processor to gather routing information about packet network devices that are members of the same AS. The route processor 22 also includes a routing table management process 25 which generally receives routing information from the BGP process 23 and the other routing protocols 24 and uses this information to construct a full routing table. The route processor 22 also includes some form of memory 26 for storing tables such as a local routing information base (RIB) and the full routing table (FIB).

BGP version 4 is defined in the IETF RFC 4271 and is well known to those who are familiar with router design and so will not be described here in any detail other than to mention that a peer relationship between packet network devices running BGP in neighboring autonomous system is established manually by a network administrator. In order to interact with each other, BGP peers run a finite state machine consisting of six states: Idle, Connect, Active, OpenSent, OpenConfirm and Established. At the point that BGP peers have negotiated capabilities and the finite state machine is running, a packet network device running BGP can receive and process update messages from peer packet network devices running BGP.

Figure 3:
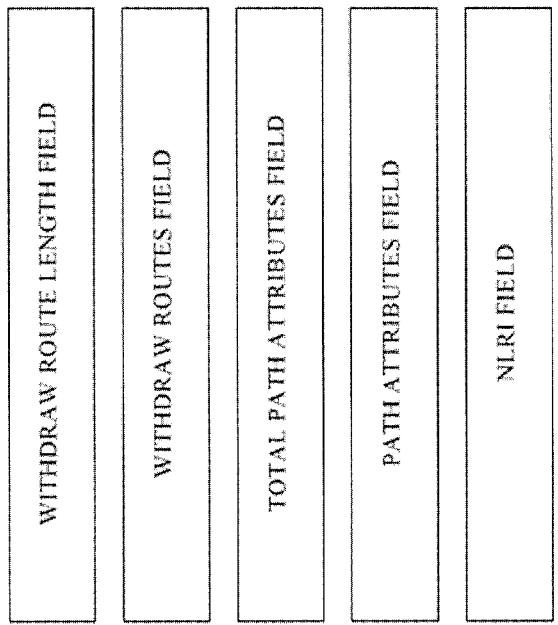
FIG. 3 is a diagram illustrating the format and general contents of a BGP update message.

FIG. 3 illustrates the message format used to send route update information from one BGP peer to another. The minimum length of the update message is 23 octets and the first two octets are devoted to a field that carries information indicating the total length of a Withdrawn Routes field. The second field is referred to as a Withdraw Routes field and it is of variable length. This field contains a list of IP address prefixes for the routes that are being withdrawn from service. The next field of 2 octets is referred to as the Total Path Attribute Length field, and it carries information indicating the total length of the Path Attributes field. The next field is of variable length and carries a sequence of one or more path attributes. IEFT RFC 4271 defines a number of path attributes a few of which are: ORIGIN, AS-PATH, NEXT_HOP, MULTI_EXIT_DISC (MED), and COMMUNITIES. Of these path attributes, the AS-PATH and COMMUNITIES attributes are variable in length, that is, variable length path attributes are comprised of one or more elements. Specifically, one or more path descriptions can be included in each AS-PATH list and one or more community descriptions can be included in a COMMUNITIES list, with each of the one or more path and community descriptions being an element in the path attribute. The remainder of the path attributes are single values and of fixed length. The meaning of each path attribute will not be described here as they are clearly defined by the IETF RFC 4271 document and well know to those skilled in the art of BGP process design. The last field is a variable length field referred to as Network Layer Reachability Information or NLRI and it is comprised of one or more IP address prefixes associated with packet network devices that are members of an AS, such as AS1 in FIG. 1. The NLRI field is composed of one or more 2-tuples of the form <length, prefix>. Each update message includes only one set of path attributes, but can include one or more prefixes in the NLRI field. All of the path attribute information included in an update message is common to each of the prefixes listed in the NLRI field.

As the size and complexity of autonomous systems increases, the number of update messages generated and sent by each BGP speaker can increase to the point that the processing of these messages by BGP running on each speaker takes an increasingly longer amount of time resulting in delaying convergence to a new network topology which can ultimately lead to loss of packets and information. In order to mitigate this problem, it is necessary to prevent the processing of some update messages received by a BGP speaker. One mechanism used to accomplish this is to filter update messages that include routing information that it is determined the BGP speaker does not need in order to route packets to their proper destination. A number of different criteria can be used when designing a strategy to filter update messages. One criteria that can be used includes any one or more of the path attributes that can be included in an update message, such as information in a PREFIX_LIST (NLRI), an AS-PATH or a COMMUNITY_LIST. Another filter criteria that can be used includes information included in a Route_Map which can be comprised of NLRI and the path attributes mentioned above or other path attributes organized in one or more sequences.

FIGS. 4A-4D illustrate the formats of four policy filters based on different criteria. Each of the policy filters include rules that BGP can use to enforce a filter policy on update messages received by a BGP speaker. FIG. 4A is one type of filter in a prefix-list format that is based on some or all of IP address prefix information included in a prefix listing stored in the route processor 22 of FIG. 2. In this case, the filter permits only three IP address prefixes and denies all other prefixes. The prefixes that the filter policy permits are in CIDR notation form and are 12.2.1.0/24, 34.1.1.1/32 and 10.1.1.0/24. The /N term indicates how many bits of the prefix are used to match. In operation, the update process 23C, in the BGP process 23 running in route processor 22 in FIG. 2, matches prefix information received in an update message against the three prefixes included in the filter, and if any of the three prefixes included in the filter match a prefix included in the update message, then the update message can be processed by the BGP process 23 running on the route processor 22. On the other hand, if there is no match between the three prefixes in the filter and the prefixes included in the update message, then the update message is not processed by BGP and is simply dropped or ignored.

FIG. 4B illustrates the format of a type of policy filter based on some or all of the AS-PATH attribute information stored in the route processor 22 of FIG. 2. In this case, the filter includes two permitted AS paths, a first AS-PATH defined as ^1234$ and a second AS-PATH defined as ^(231_)+(112_)+$. All other AS-PATHs will be denied. In operation, the update process 23C matches the two AS-PATHs included in the filter against all of the AS-PATHs included in an update message, and if there is a match between any of the AS-PATHs in the filter and the update message, the update message will be processed by the BGP process 23, otherwise, the message will be dropped and not processed.

FIG. 4C illustrates the format of a type of policy filter based on Communities included in a list of Communities stored in the route processor 22 memory 26. The first Community has a value of 6543:2245 and the second Community "no-advertise" is the name of a reserved community having value 0:2. In operation, the update process 23C matches the two Community values against Community values included in an update message and allows the message to be processed if there is a match, but drops the message if the update message includes a Community value that does not match either one of the two values included in the filter.

FIG. 4D illustrates the format of a type of policy filter based on the contents of a Route-Map. A Route-Map can be comprised of multiple sequences each one of which can include path attributes or NLRI or both. In this case, FIG. 4D includes three sequences, each sequence starts with the clause, "route-map filter-pa permit", and each clause typically ends in a sequence number, such as 10, 20, 30 and so forth. Routing information can be filtered based on any of the path attributes included in an update message, such as Origin, AS-PATH, Community, Next-Hop, MED to name a few, and routing information can be filtered based on IP address prefixes listed included in NLRI, or routing information can be filtered using both path attributes and NLRI. The Route-Map in FIG. 4D includes a first sequence 10 that includes one or more IP address prefixes, a second sequence 20 that includes AS-PATH information, which can be comprised of one or more AS-PATHs, and it includes next-hop information, which can be one or more IP addresses associated with a next-hop destination, and the Route-Map includes a third sequence 30 that includes Origin information and Community information. In operation, the BGP process 23 operates on each the attributes or NLRI information included in each sequence in the Route, and when all of the information in a sequence matches the path attribute and NLRI information included in an update message, BGP stops operating on any subsequent Route-map sequences and the update message is then processed. So, for example, if the prefixes included in an update message match those listed Route-Map sequence 10, BGP does not go on to process sequences 20 and 30, but stops and accepts or permits the information included in the update message.

Given the general policy filter configuration illustrated in FIG. 5, a typical prior art inbound update message filtering process 60 will proceed as described with reference to the logical flow diagram of FIG. 6. Briefly, FIG. 5 shows an inbound filter that uses a Prefix-list (P1) to filter NLRIs, an AS-PATH list (A1) to filter AS-PATHs, and a Route-Map containing NLRIs (P2), Communities (C1) and AS-PATHs (A2). All of the information included in the policy filter illustrated in FIG. 5 is typically used to filter inbound update message as described in FIG. 6. In step 1 of FIG. 6, a BGP speaker receives an inbound update message and sends the message to its update message processing module 23C where, in step 2, the Prefix-lists P1 and P2, AS-PATH lists A1 and A2 and Community-list C1 are matched against the first or next prefix included in the NLRI and the path attributes associated with each prefix in the update message. Then, in step 3 if there is no match the process returns to step 2. However if there is a match, the process accepts or permits the update message and the information in the message is processed.

Figure 6:
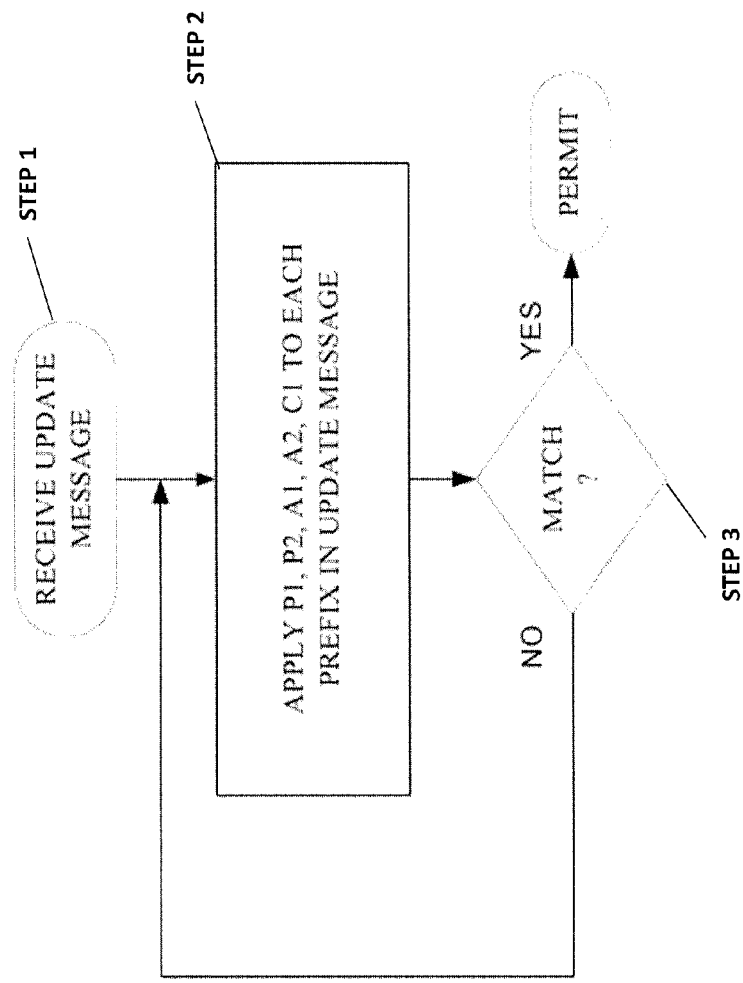
FIG. 6 is a diagram illustrating a prior art policy filter process.

An examination of the filtering process 60 described with respect to FIG. 6 leads to the conclusion that step 2 includes multiple and redundant steps, as all of the path attributes for each prefix in an update message are the same. So, in the event that the attributes associated with the first prefix included in the NLRI in the update message match or do not match those in the policy filter, there is no need to perform step 2 a second or more times, as these second and subsequent filtering steps are redundant. This redundancy in the filtering process takes time and ultimately results in the BGP process running on a speaker taking longer to update existing routing tables.

Given the general policy filter configuration illustrated in FIG. 7, an embodiment of an inbound update message filtering process 80 that does not employ the redundant filter steps employed by prior art processes as described with reference to FIG. 6 will typically proceed as described with reference to the logical flow diagram of FIG. 8. FIG. 7 shows an embodiment of an inbound policy filter configuration 70 that can be used in conjunction with the policy filter process described with reference to FIGS. 8A-8D below. Filter 70 is configured with explicitly applied path attributes that are of fixed length, such as Next-Hop, MED, Origin, etc.), it uses explicitly applied prefix-list P, and an explicitly applied path attributes that are of variable length, such as a Community-list C, an explicitly applied AS-PATH-list A and an explicitly applied Route-Map R. The prefix-list P can include one or more IP address prefixes and the Community-list C can include one or more Community tags. The Route-Map R can include one or more sequences N, and each sequence can include one or more implicit filter criteria which can be one or more path attributes or prefix list for NLRIs or both. Explicitly applied in the context of this inbound policy filter means that the filter criteria are discrete filter policy criteria that are not associated with a Route-Map.

Figure 8B:
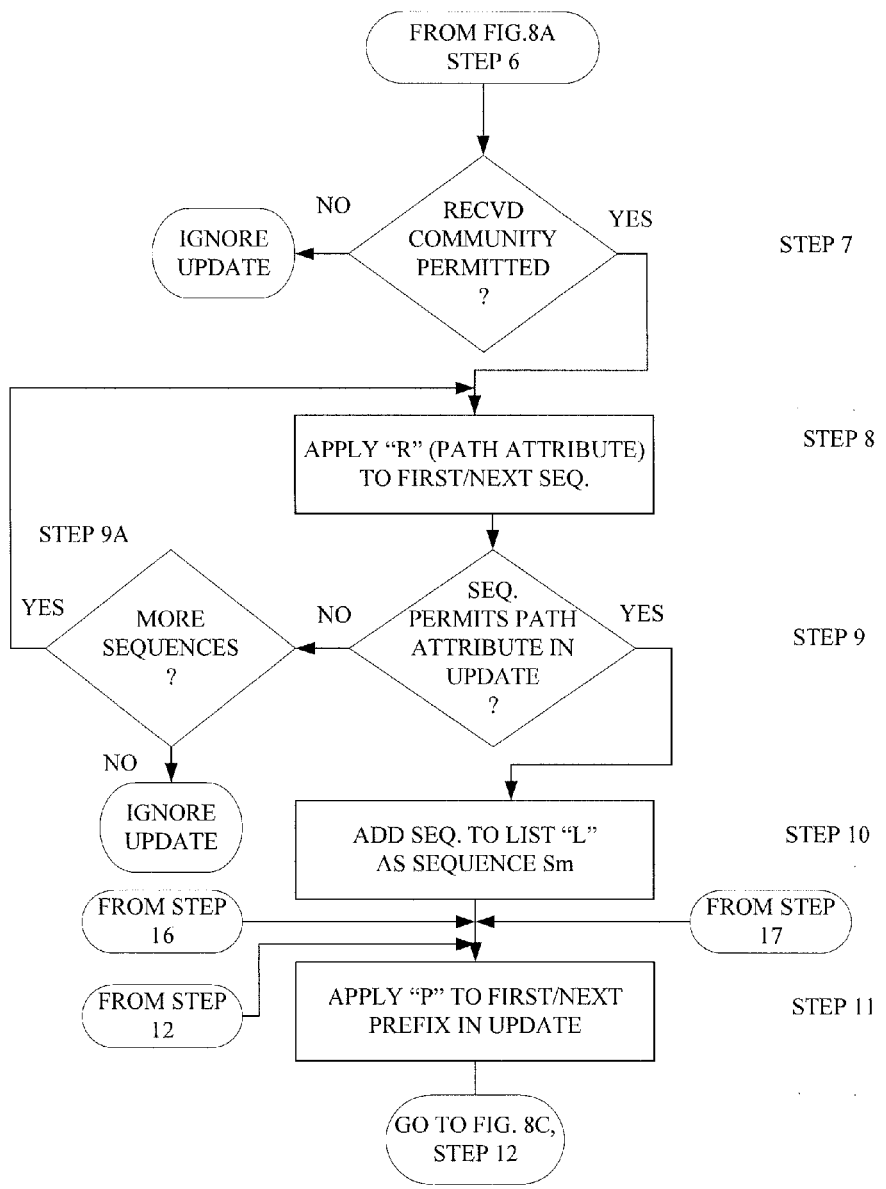

FIGS. 8A-8D illustrate a logical flow diagram of an embodiment of a policy filtering process 80 that operates to reduce the redundant filtering steps employed by the filter process described above with reference to FIG. 6. Empirical analysis indicates that policy filtering process 80 can reduce redundant filtering steps by as much as two orders of magnitude. Referring to FIG. 8A, in step 1, a BGP speaker, such as speaker A in FIG. 1, receives an update message from a peer speaker, such as speaker F, which is comprised of one or more path attributes and NLRI. In step 2, speaker A applies all of the fixed length path attributes included in the policy filter 70 to the path attributes included in the update message. If, in step 3, all of the path attributes in the update message are permitted, then the filter process proceeds to step 4, otherwise the process terminates and the update message is dropped or ignored. In step 4, the AS-PATH list A is applied to the path information included in the update message and the filter process proceeds to step 5. If in step 5, if at least one path is permitted, the process proceeds to step 6, otherwise the process terminates and the update message is dropped. In step 6, the Community-list C is applied to the update message, and the process proceeds to step 7.

Referring now to FIG. 8B, if in step 7 at least one Community tag in the update message is permitted, then the filter process proceeds to step 8, otherwise the update message is dropped. At this point in the update message filtering process, all of the explicit path attribute filter criteria have been applied to the update message, and the filter process now proceeds to apply implicit path attributes, included in the Route-Map described earlier with reference to FIG. 7, to the update message. In step 8, the filter process applies only the path attributes included in the first sequence, comprising the Route-Map in FIG. 7, to the update message and the process proceeds to step 9. In step 9, if the first sequence does not permit the path attributes included in the update message the process proceeds to step 9A where a determination is made whether there are any more sequences to apply to the update message. If there are, the process returns to step 8 and applies the next sequence in the Route-Map to the update message, otherwise the update message is dropped. If, on the other hand, in step 9 the selected sequence permits the path attributes included in the update message, the process proceeds to step 10 and the selected sequence is added to a list "L" as Sequence Sm and the process proceeds to step 11. At this point in the process, the following operations are performed on each prefix included in the update message received by the BGP speaker A. In step 11, the explicit prefix list P included in the policy filter configured as described in FIG. 7 is applied to the first prefix in the update message and the process proceeds to step 12.

Figure 8C:
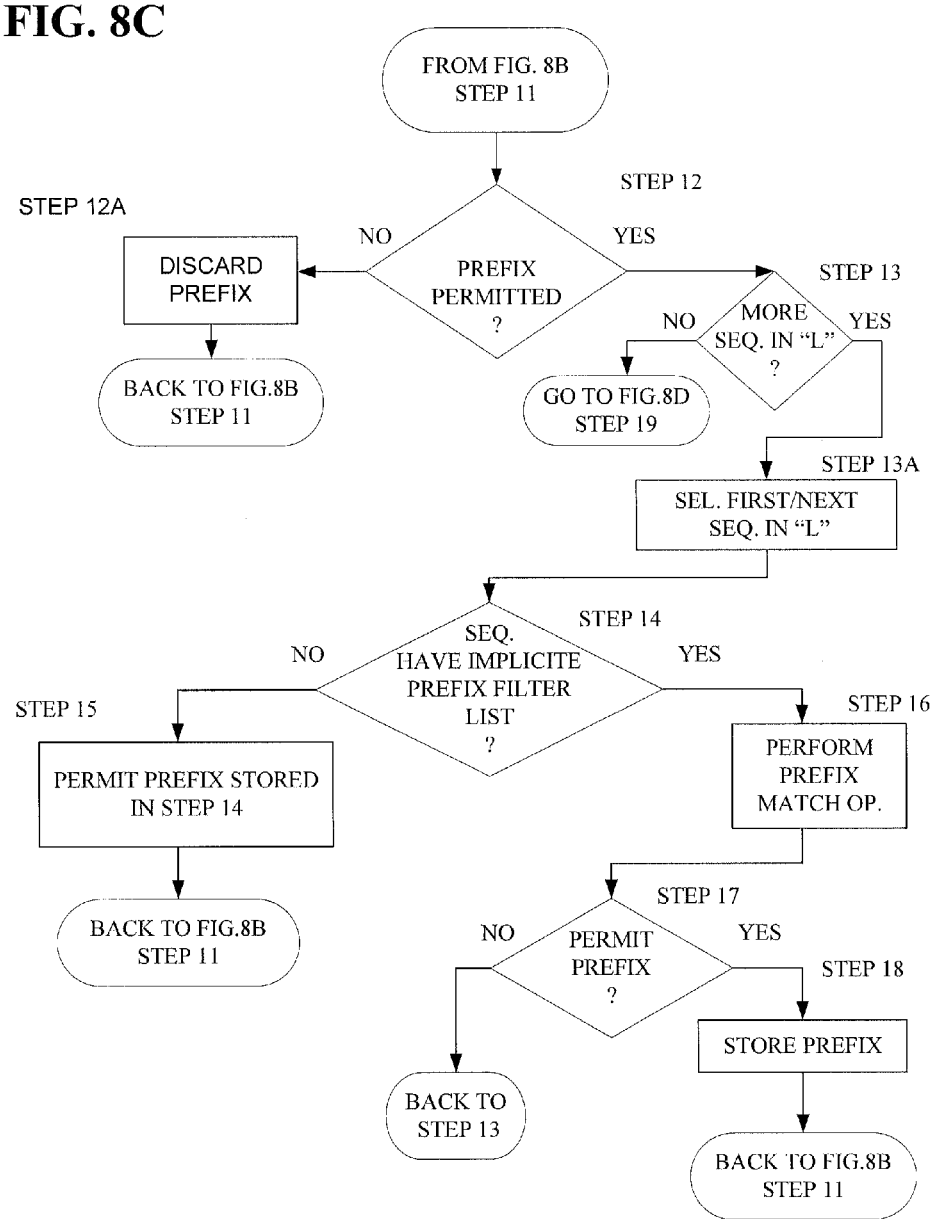

Referring now to FIG. 8C, if in step 12 the first prefix in the update message is permitted, the process proceeds to step 13, otherwise in step 12A the prefix is discarded and the process returns to step 11 where list P is applied to the next prefix in the update message. In step 13, if there are more sequences in list "L" that have to be applied, the process proceeds to step 13a where the first or next sequence included in the list "L" created in step 10 of the process is selected. Otherwise, the filter process proceeds to step 19 in FIG. 8D. In step 14, if the first Route-Map sequence selected in step 13a includes a prefix-list filter, then the process proceeds to step 16 where the prefix list is applied to prefixes included in the update message and the process proceeds to step 17. However, if the sequence does not include a prefix-list filter, then the process proceeds to step 15 where the prefix is permitted and the process returns to step 11 where the next prefix in the update message is processed. And, if after applying the prefix-list in step 16 the prefix is permitted in step 17, then the in step 18 the prefix is stored and process returns to step 11, where the next prefix in the update message is processed. However, if in step 17 the result of applying the prefix-list in step 16 is to not permit the prefix, then the process returns step 13, where a determination is made whether there are any more sequences in the list "L". In this case the next sequence can be labeled as sequence Sm+1, and each subsequent time step 13A is performed, the sequence label number is incremented by one.

Figure 8D:
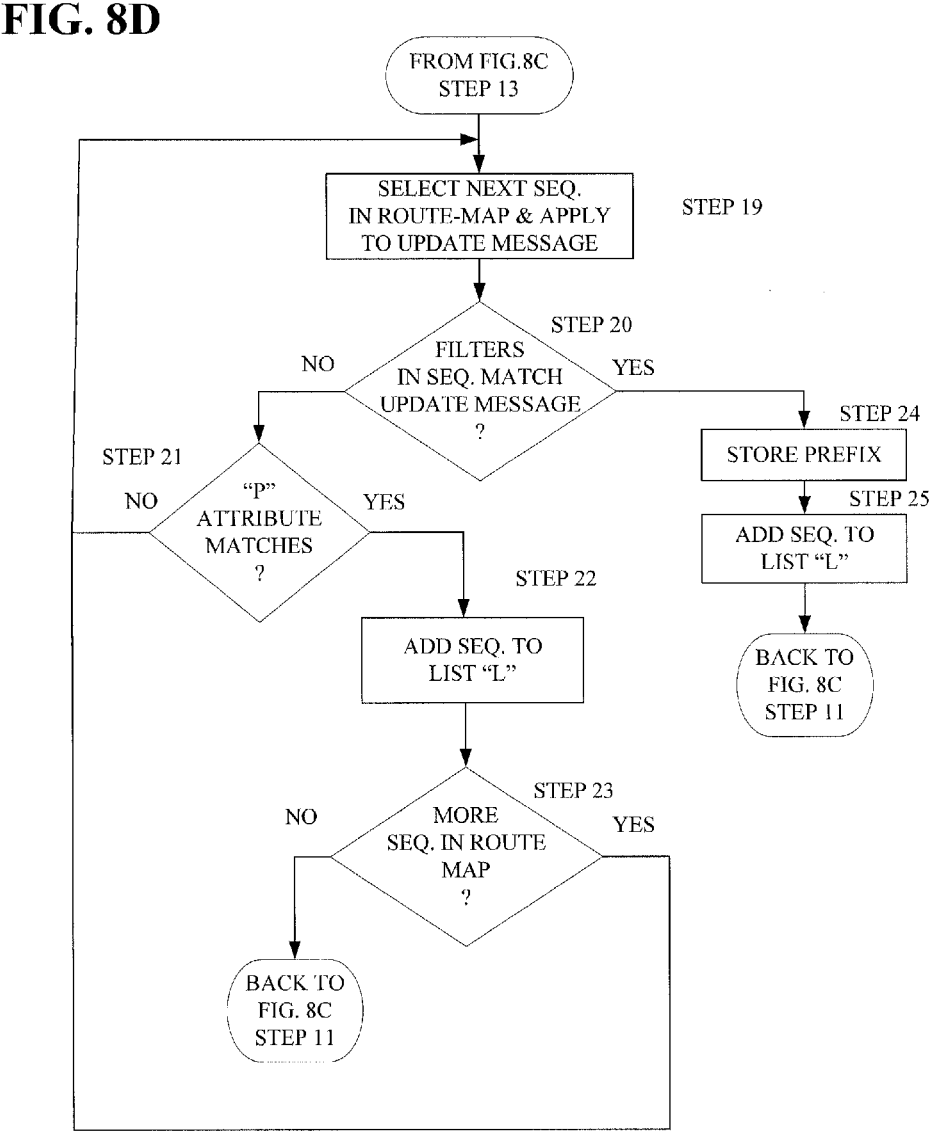

Referring back to step 13, if as described earlier there are no more sequences in list "L", then the process proceeds to step 19 in FIG. 8D.

Referring now to FIG. 8D, after the next sequence is selected in step 19, if in step 20 the path attributes in the sequence match those in the update message and if at least one prefix included in the filter matches a prefix in the update message, then in step 24 the prefix is stored, the sequence Sm+1) is added to list "L in step 25 and the process returns to step 11 in FIG. 8C. In other words, sequence Sm+1 is stored in the list "L" in such as manner that it can be selected as the next sequence in step 13a during the second time that step 13a is performed. On the other hand, if there is not match in step 20, then the process proceeds to step 21 and a determination is made whether or not there is a match between the path attributes in the filter and the path attributes in the update message. If there is a match, then in step 22 the sequence is added to list "L", otherwise the process returns to step 19. After the sequence is added to list "L" in step 22, the process proceeds to step 23 and determines whether there is a next sequence included in the Route-Map, and if so the process returns to step 19, otherwise the process returns to step 11.

The filter strategy employed by the update message filter process 80 embodiment described with reference to FIG. 8 ensures that the path attribute policy filters are applied only once for each update message received by a BGP speaker and that the NLRI based prefix-list filters are applied for each prefix included in an update message, in this manner, it is possible to filter incoming update messages without performing redundant filtering steps. As a result, the BGP process running on speakers can converge to a stable network topology in less time that is otherwise possible.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for filtering update messages received by a border gateway protocol (BGP) capable packet network device, comprising:
   configuring a policy filter in the packet network device with a filter explicit path attribute, a filter explicit prefix attribute, and a route map including a filter implicit path attribute and a filter implicit prefix attribute;
   receiving an update message that includes a plurality of message attributes;
   applying the filter explicit path attribute to the update message prior to applying the route map to the update message;
   in response to the filter explicit path attribute permitting at least one path in the plurality of message attributes, applying the filter implicit path attribute in the route map to the update message without applying the filter implicit prefix attribute in the route map to the update message; and in response to the filter implicit path attribute in the route map not permitting at least one path in the plurality of message attributes, dropping the update message without applying the filter explicit prefix attribute to the update message.

2. The method of claim 1, further comprising:
in response to the filter implicit path attribute in the route map permitting at least one path in the plurality of the message attributes, adding the filter implicit path attribute to a list.

3. The method of claim 2, further comprising:
in response to adding the filter implicit path attribute to the list, applying the filter explicit prefix attribute to a first prefix in the plurality of message attributes.

4. The method of claim 3, further comprising:
in response to the filter explicit prefix attribute not permitting the first prefix, discarding the first prefix and applying the filter explicit prefix attribute to a second prefix in the plurality of message attributes.

5. The method of claim 3, further comprising:
in response to the filter explicit prefix attribute permitting the first prefix, applying the filter implicit prefix attribute in the route map to the first prefix.

6. The method of claim 5, further comprising:
in response to the filter implicit prefix attribute in the route map not permitting the first prefix, discarding the first prefix.

7. The method of claim 5, further comprising:
in response to the filter implicit prefix attribute in the route map permitting the first prefix, storing the first prefix.

8. A method for filtering update messages received by a border gateway protocol (BGP) capable packet network device, comprising:
configuring a policy filter in the packet network device with a plurality of filter explicit path attributes, a plurality of filter explicit prefix attributes, and a route map including a plurality of filter implicit path attributes;
receiving an update message including a plurality of message attributes;
applying each one of the plurality of filter explicit path attributes to the update message prior to applying the route map to the update message;
in response to each of the plurality of filter explicit path attributes permitting at least one path in the plurality of message attributes, applying the plurality of filter implicit path attributes in the route map to the update message; and
in response to the plurality of filter implicit path attributes in the route map not permitting at least one path in the plurality of message attributes, dropping the update message without applying the plurality of filter explicit path attributes to the update message.

9. The method of claim 8, further comprising:
in response to a first filter implicit path attribute in the plurality of filter implicit path attributes in the route map permitting at least one path in the plurality of message attributes, adding the first filter implicit path attribute to a list.

10. The method of claim 9, further comprising:
in response to adding the first filter implicit path attribute to the list, applying the plurality of filter explicit prefix attributes to a first prefix in the plurality of a message attributes.

11. The method of claim 10, further comprising:
in response to the plurality of filter explicit prefix attributes not permitting the first prefix, discarding the first prefix and applying the plurality of filter explicit prefix attributes to a second prefix in the plurality of message attributes.

12. The method of claim 10, further comprising:
in response to the plurality of filter explicit prefix attributes permitting the first prefix, determining whether the route map includes at least one filter implicit prefix attribute.

13. The method of claim 12, further comprising:
in response to the route map including at least one filter implicit prefix attribute, applying the at least one filter implicit prefix attribute in the route map to the first prefix.

14. The method of claim 13, further comprising:
in response to the at least one filter implicit prefix attribute in the route map not permitting the first prefix, discarding the first prefix.

15. The method of claim 13, further comprising:
in response to the at least one filter implicit prefix attribute in the route map permitting the first prefix, storing the first prefix.

16. A border gateway protocol (BGP) capable packet network device, comprising:
a line card comprised of a packet processor, a memory, and a plurality of input/output ports all of which operate to receive update messages from a peer BGP capable packet network device; and
a route processor comprised of a BGP process and a memory, wherein the BGP process includes a policy filter including a filter explicit path attribute, a filter explicit prefix attribute, and a route map including a filter implicit path attribute, and wherein the route processor is configured to:
receive an update message that includes a plurality of message attributes;
apply the filter explicit path attribute in the policy filter to the update message prior to applying the route map to the update message;
in response to the filter explicit path attribute permitting at least one path in the plurality of message attributes, applying the filter implicit path attribute in the route map in the policy filter to the update message; and
in response to the filter implicit path attribute in the route map not permitting at least one path in the plurality of message attributes, dropping the update message without applying the filter explicit prefix attribute to the update message.

17. The BGP capable packet network device of claim 16, wherein the route processor is configured to:
in response to the filter implicit path attribute in the route map permitting at least one path in the plurality of message attributes, applying the filter explicit prefix attribute to a first prefix in the plurality of message attributes.

18. The BGP capable packet network device of claim 17, wherein the route processor is configured to:
in response to the filter explicit prefix attribute not permitting the first prefix, discarding the first prefix and applying the filter explicit prefix attribute to a second prefix in the plurality of message attributes.

19. The BGP capable packet network device of claim 18, wherein the route processor is configured to:
in response to the filter explicit prefix attribute permitting the first prefix, determining that that the route map includes a filter implicit prefix attribute and applying the filter implicit prefix attribute in the route map to the first prefix.

20. The BGP capable packet network device of claim 19, wherein the route processor is configured to:
  discard the first prefix in response to the filter implicit prefix attribute in the route map not permitting the first prefix; and
  store the first prefix in response to the filter implicit prefix attribute in the route map permitting the first prefix.

* * * * *